United States Patent [19]

Danielsson

[11] Patent Number: 4,661,035

[45] Date of Patent: Apr. 28, 1987

[54] COLLAPSIBLE WHEEL-CHAIR AND APPARATUS FOR LIFTING THE WHEEL-CHAIR INTO AND OUT FROM AN AUTOMOBILE

[75] Inventor: Jan-Erik Danielsson, Sala, Sweden

[73] Assignee: Rolf Ahlbergs Mekaniska Verkstad AB, Fjärdhundra, Sweden

[21] Appl. No.: 775,006

[22] Filed: Sep. 11, 1985

Related U.S. Application Data

[63] Continuation-in-part of Ser. No. 523,675, Aug. 16, 1983, abandoned.

[30] Foreign Application Priority Data

Aug. 25, 1982 [SE] Sweden ............................... 8204870

[51] Int. Cl.$^{4}$ ......................... B62D 63/02; B60P 1/46

[52] U.S. Cl. ............................ 414/550; 280/242 WC; 280/289 WC; 280/642; 280/657; 414/921

[58] Field of Search ............... 414/921, 543, 550, 539, 414/546, 680, 541, 542; 280/242 WC, 289 WC, 642, 650, 657, 250

[56] References Cited

U.S. PATENT DOCUMENTS

| | | | |
|---|---|---|---|
| 2,415,205 | 2/1947 | Gartin | 414/744 X |
| 2,846,091 | 8/1958 | Heffner | 414/921 X |
| 3,033,059 | 5/1962 | Melton et al. | 414/744 X |
| 3,882,949 | 5/1975 | Anderson | 180/8.2 |
| 4,142,641 | 3/1979 | Dake | 414/921 X |
| 4,155,587 | 5/1979 | Mitchell | 296/65 R |
| 4,170,368 | 10/1979 | Southward et al. | 280/242 WC |
| 4,391,379 | 7/1983 | Paffrath | 414/921 X |
| 4,457,663 | 7/1984 | Hems et al. | 414/921 X |
| 4,483,653 | 11/1984 | Waite | 414/541 |

FOREIGN PATENT DOCUMENTS

| | | | |
|---|---|---|---|
| 36293 | 3/1981 | European Pat. Off. . | |
| 2480206 | 10/1981 | France | 414/921 X |
| 2483222 | 12/1981 | France | 414/921 X |
| 68946 | 8/1979 | Sweden . | |
| 472213 | 6/1969 | Switzerland . | |
| 2069969 | 9/1981 | United Kingdom | 414/921 X |

*Primary Examiner*—Robert J. Spar
*Assistant Examiner*—Stuart J. Millman
*Attorney, Agent, or Firm*—Witherspoon & Hargest

[57] ABSTRACT

The invention relates to an apparatus for lifting a wheel-chair into and out from a vehicle, having a lifting arm which may be connected to the wheel-chair. According to the invention the apparatus comprises a substantially Z-shaped stand (4) having a lower support and mounting plate (5) intended to be attached to the vehicle floor at the place for the driver's seat by means of a number, suitably three, of bolts (6), and a substantially vertical middle portion (7) an an upper support plate (8) intended to be positioned on top of the back seat of the vehicle, a lifting mechanism (25–45) and a swinging equipment (36–45) for the lifting arm (3) whereby the lifting arm (3) and the lifting mechanism (25–34) and the swinging equipment (36–45) are carried by the upper support plate (8) of the stand (4). The invention also relates to a collapsible wheel-chair especially adapted for use together with the lifting apparatus.

7 Claims, 9 Drawing Figures

Figure 1:
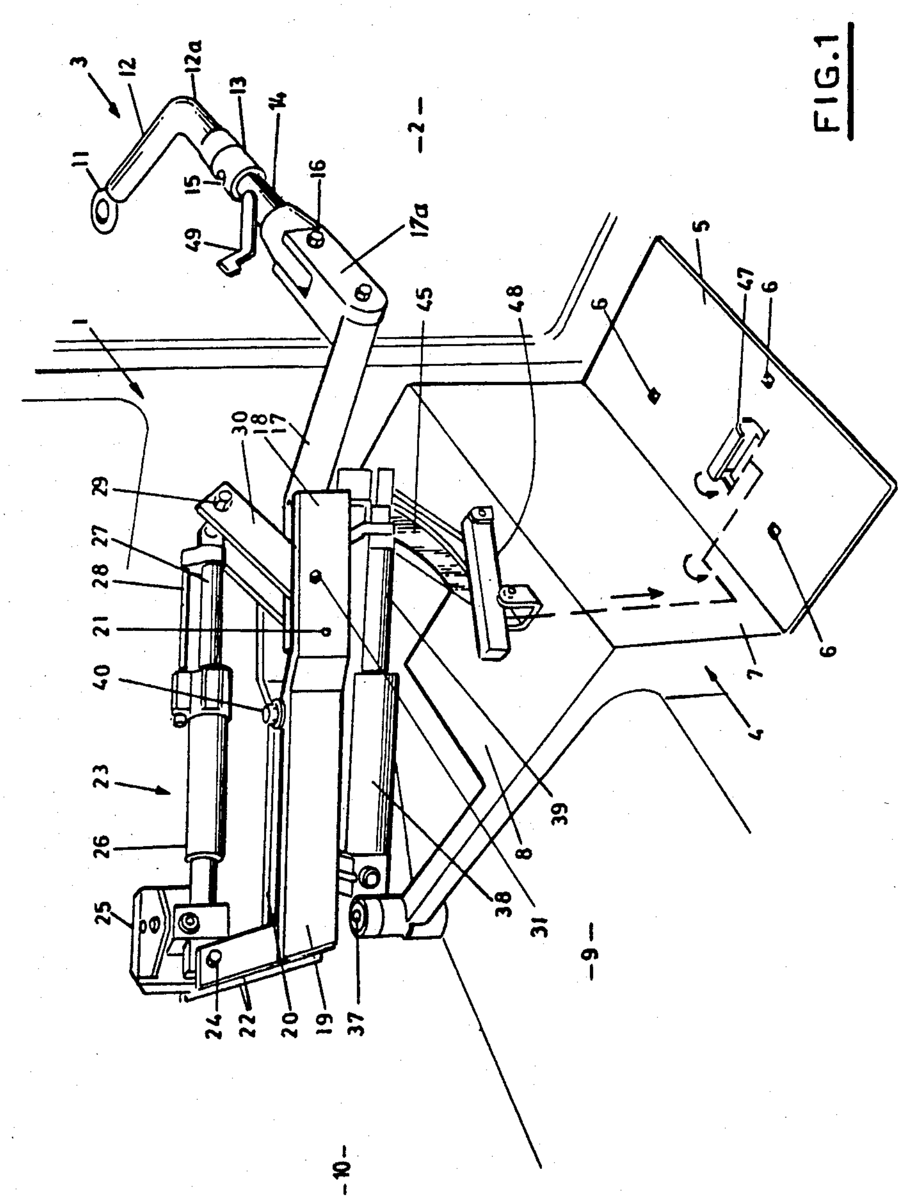

COLLAPSIBLE WHEEL-CHAIR AND APPARATUS FOR LIFTING THE WHEEL-CHAIR INTO AND OUT FROM AN AUTOMOBILE

This is a continuation-in-part of application Ser. No. 523,675, filed Aug. 16, 1983, now abandoned.

The present invention relates generally to a collapsible wheel-chair and an apparatus for lifting the wheel-chair into and out from an automobile, and more particularly the invention relates to such an arrangement where the wheel-chair is collapsible from a condition in which the user uses the wheel-chair as a conventional wheel-chair for transportion indoors and outdoors, to a second condition where the wheels of the wheel-chair are retracted and the wheel-chair is used as a driver's seat in an automobile. In accordance with the invention there is moreover provided an apparatus for lifting the wheel-chair into and out from the automobile, which is being done by means of a lifting arm to which the wheel-chair is attached by means of lifting straps, whereupon the lifting arm on the one hand can lift and lower respectively the wheel-chair with the user sitting therein, and on the other hand can swing sideways between a position outside the door opening of the automobile and a position within the automobile.

Many different attempts have been made to provide arrangements assisting disabled persons to get into and out from an automobile. Different types of handicaps do naturally require different solutions, and the present invention is especially, but not exclusively, directed to assisting persons tied to a wheel-chair and having motion handicap in their legs or hips, leg-amputated persons or the like.

By using a wheel-chair which on the one hand can be used by the disabled by himself for moving about indoors and outdoors, and on the other hand can be used as the actual driver's seat in the automobile it becomes possible for the disabled himself, that is without the need for an assistant, to move from his home to the car, to get into the car, to drive the car to the desired location, to get out of the car, to use the wheel-chair to move for instance inside and between shops, service centers, public institutions and the like, and subsequently to travel back home again in the reverse order. Today this is impossible for many disabled since the existing systems often rely upon the fact that the disabled is lifted out from his wheel-chair and into the car, that the wheel-chair subsequently has to be put into the luggage compartment, and even if the disabled can drive his car by himself by means of different auxiliary devices in the vehicle there is required an assistant for unloading the wheel-chair from the luggage compartment and for lifting the disabled from the driver's seat to the wheel-chair at the arrival. A typical example of an arrangement where an assistant always must be at hand, is illustrated and described in U.S. Pat. No. 4,170,368, where indeed the same chair is used as seat for the wheel-chair and as driver's seat in the car, but where the seat itself is disassembled from the frame of the wheel-chair and is lifted into the car whereupon an assistant must take care of the frame in order to place it in the luggage compartment, and at the arrival an assistant is required once more for lifting out the frame and for placing the frame in a correct position for assembly with the seat. This known structure is also an example of another typical arrangement, namely where the docking takes place from behind, that is the wheel-chair must be backed in towards a lifting means, be connected to this lifting means and subsequently be lifted backwards into the car. Besides the difficulty in handling into the car. Besides the difficulty in handling a docking operation with the back facing the equipment it will be understood that the swinging movement will be backwards, that is the person will be lifted into the car backwards, which means difficulties regarding the height adjustment so that the back of the person's head does not strike against the upper edge of the door opening, and will subsequently be swung forwardly towards the steering wheel which in this case often constitutes an obstacle since it is positioned in the actual path of movement. Other examples of chairs that are engaged and lifted from behind are disclosed in for instance U.S. Pat. Nos. 3,882,949 and 4,155,587 and in Swedish patent application No. 7906894-6.

Another type of arrangement for lifting a wheel-chair into and out from respectively an automobile comprises a swinging arm that is journalle forwardly inside the door opening of the car, and the other free end of which is intended to be connected to the wheel-chair in a docking operation, whereupon the arm lifts and swings the wheel-chair into the car. This type of arrangement is illustrated and disclosed for instance in European patent application No. 81301028.7 (publication No. 36293). By arrangements of this kind the steering wheel will likewise prevent a quick and easy lifting of the wheel-chair and the user into and out from the car. Often the car must be modified in such a way that the steering wheel can be brought aside and besides the fact that this is obviously a very expensive and complicated method it does also give rise to certain risks during the use thereof if for instance the movable steering wheel can be disengaged. Moreover the whole arrangement will be positioned in front of the wheel-chair when the car is driven which in itself can be a hindrance.

Still another type of wheel-chair and an apparatus for lifting the same into and out from an automobile shall be discussed herein, namely the one illustrated and described in CH-patent specification No. 472.213. Similarly to the present invention this known structure uses the wheel-chair both as such and as driver's seat in the automobile. However, the large, rear wheels of the wheel-chair must be disassembled in connection with the conversion of the wheel-chair to a driver's seat which is to be lifted into the car. This is impossible for the user himself to do without any aid from an assistant. The apparatus for lifting the wheel-chair into and out from the car consists of a lifting arm which is slidably mounted on a transversal guide beam extending across the full width of the car. This guide beam can in turn be raised and lowered respectively by manually pumping a hydraulic lifting device, and hereby the lifting arm can be raised and lowered. It is indicated that the lifting arm will be connected to the wheel-chair which probably takes place in a docking operation which most likely means that the arm in a not shown manner is coupled together with the actual wheel-chair.

The above detailed statement of the previously known attempts to provide a wheel-chair and an operation for lifting the wheel-chair into and out from an automobile has been made in order to point out some of the many previously known attempts to solve the problems that exist in this connection. In accordance with the invention the wheel-chair and an apparatus for lifting the wheel-chair into and out from an automobile are provided by which the above indicated problems have been solved.

The object of the invention is thus to provide a wheel-chair that can be used partly as a means of transportation in itself and partly as a driver's seat in an automobile, and the object of the invention is also to provide an apparatus for lifting the wheel-chair into and out from an automobile.

Another object of the invention is to provide an arrangement where the user himself without requiring any assistant can move in the wheel-chair from his home and to the car, by himself can perform all the necessary connecting and maneuvering operations for lifting the wheel-chair (with the user sitting therein) into the car, can drive the car to the intended place, by himself can perform the necessary maneuvers and connecting operations for lifting the wheel-chair out from the car and subsequently can use the wheel-chair to move around. The fact that the disabled user himself without the need for any assistant can move from his home and to a desired place increases his freedom or independence which is very essential for the psychical well-being.

Another object of the invention is to provide an apparatus for lifting a wheel-chair into and out from an automobile, which apparatus can be mounted in any automobile having a suitably large door opening without any other modifications to the automobile than the disassembly of its regular driver's seat, and the installing of the lifting apparatus according to the invention in its place by means of simple bolt connections.

Another object of the invention is to provide a lifting apparatus for lifting a wheel-chair into and out from a car, which lifting apparatus does not block more than one seat (apart from the driver's seat), namely the seat behind the driver's seat. Hereby it is possible, when desired, to let at least two passengers ride in the car.

Still another object of the invention is to provide a lifting apparatus for lifting a wheel-chair into and out from an automobile, where the requirement for muscular strength on the part f the user is very small, at the same time as the user himself without the need for any assistant, can operate the control means that are provided for operating the lifting apparatus sideways and vertically.

Other objects of the invention that are not mentioned here will be understood by a man skilled in the art to the extent that they are not clear from the following description, the enclosed patent claims and the accompanying drawings.

The features especially characterizing the invention are clear from the enclosed patent claims.

Figure 2:
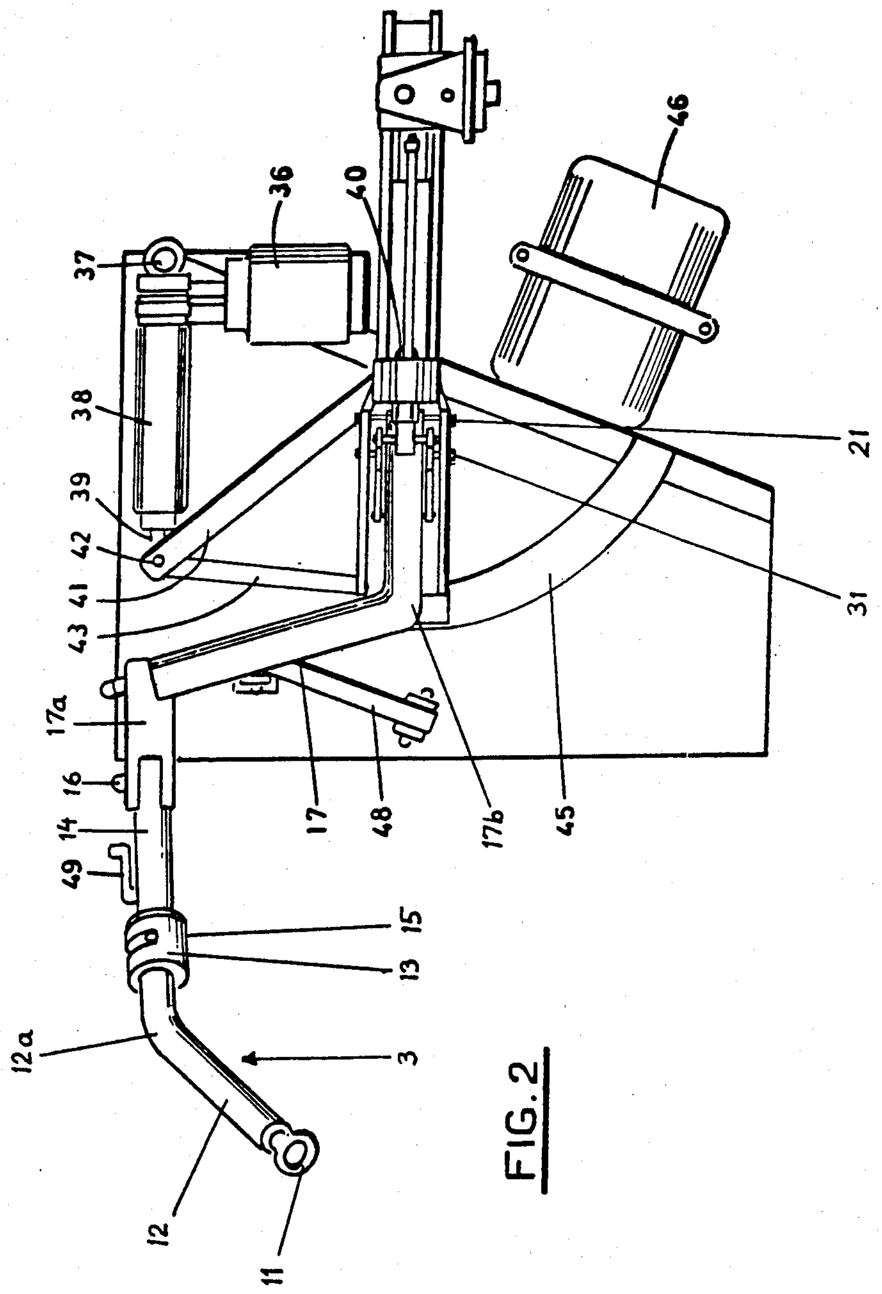

The invention will be more closely described below with reference to the embodiment illustrated in the enclosed drawings where:

FIG. 1 is a schematic perspective view illustrating the apparatus for lifting a wheel-chair into and out from a car, where the lifting arm is shown swung out through the door opening of the car to a position where it is to be connected to the lifting straps of the wheel-chair, FIG. 2 illustrates the lifting apparatus according to the invention seen from above with the lifting arm shown in an inwardly swung position in which the disengagement of the lifting straps of the wheel-chair is to take place, FIG. *3a* is a side view illustrating the lifting apparatus according to the invention seen from the side of the door opening and where especially the lifting mechanism is illustrated, FIG. *3b* is a schematic view similar to FIG. *3a* with one of the foot plates removed and with one of the transfer link plates partly cut away for reasons of clarity.

Figure 4:
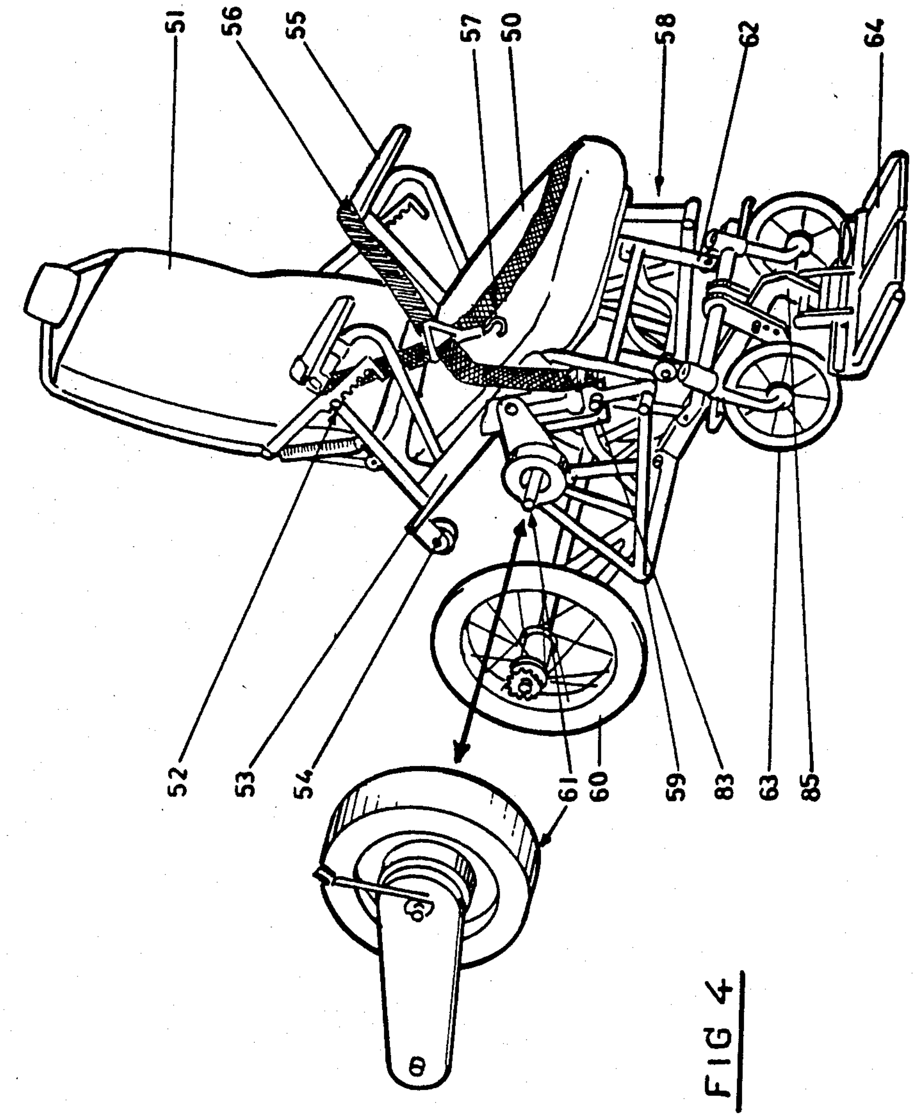
Figure 5:
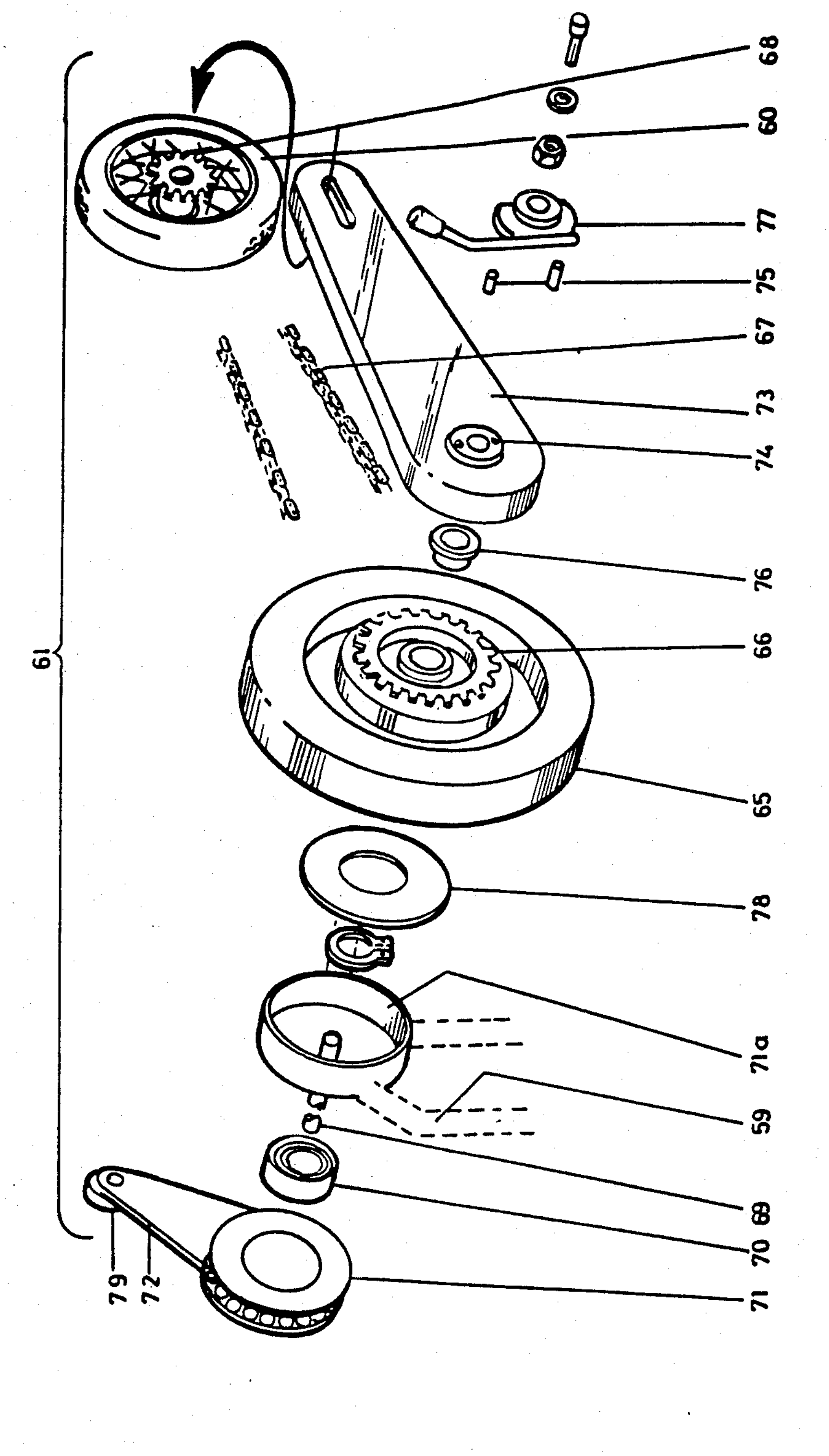

FIG. 4 is a schematic perspective view illustrating a wheel-chair according to the invention, FIG. 5 is an exploded view illustrating the propulsion and folding arrangement for the wheel-chair according to FIG. 4, FIG. *6a* is a side view illustrating the cradle of the wheel-chair frame in an extended position, FIG. *6b* is a cross-section along the line B—B in FIG. *6a,* and FIG. *6c* is a schematic illustration of the folding of the cradle.

The lifting apparatus according to the invention is in the drawings illustrated mounted in an automobile 1 through the door opening 2 of which the lifting arm 3 of the lifting apparatus can be swung out. A substantially Z-shaped stand 4 comprises a lower support and mounting plate 5, which by means of bolts 6 is bolted to the floor of the car at the place for the driver's seat. The stand furthermore comprises a substantially vertical middle portion 7 and an upper support plate 8 which is positioned on top of the seat cushion 9 of the back seat or just above the same. By the installation of the apparatus according to the invention neither the seat cushion 9 of the back seat nor its backrest 10 are worked upon, and no limitation is being put on the space by the front passenger's seat or the passenger's seat or seats behind the front passenger's seat. The only modification that is necessary to perform to the vehicle in connection with the installation is that the regular driver's seat is disassembled, whereafter the lifting apparatus is lifted into the car and is mounted to the vehicle floor by means of the illustrated bottom bolts 6.

The lifting apparatus which is supported by the stand 4 comprises a lifting arm 3 by the outer free end of which a catching loop 11 is provided. The outer part 12 of the lifting arm 3 is bent at an angle at 12*a,* and at 13 it is rotatably mounted to a middle shaft 14. A movement restriction stop 15 blocks the turning movement of the outer part 12 of the lifting arm. The middle shaft 14 is hinged at 16 to a connecting piece 17*a* of a portion 17 that is bent at an angle at 17*b* and that extends in towards a supporting foot 18 in the shape of a pair of bifurcately combined foot plates 19, 20. The entire lifting arm 3 is journalled for a pivotal movement around an axis 21.

The bifurcately mounted foot plates 19 and 20 are at their rear ends provided with an upwardly extended portion 22 to which a lifting mechanism 23 is mounted at 24. The lifting mechanism comprises an electrical motor 25, the output shaft of which is connected to a driving means 26 through a transmission. An output shaft 27 having a position sensing rod 28 provided with a limit switch is at 29 connected to a motion transfer link 30 in the shape of two angularly bent plates extending parallel to each other at a distance from each other and pivotally journalled at 31, which link at the forwardly bent portion 32 is provided with a pressure roll 34 which is mounted at 33 and which from below contacts the rear portion 17 of the lifting arm extending between the two transfer link plates.

Figure 3A:
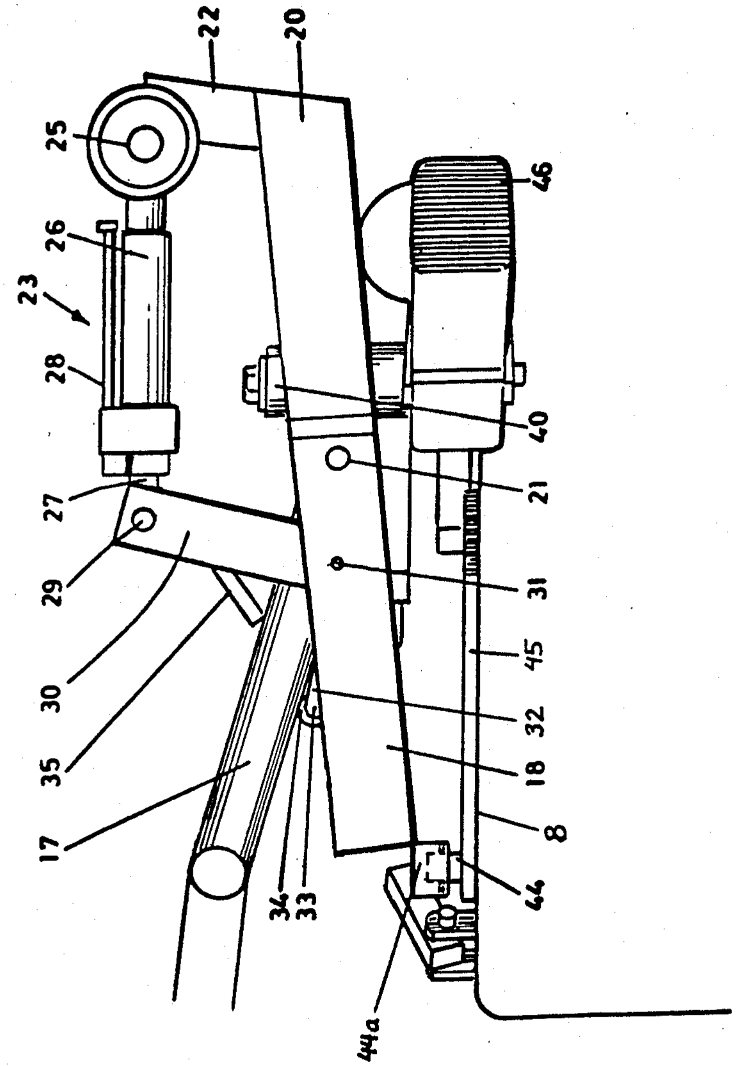
Figure 3B:
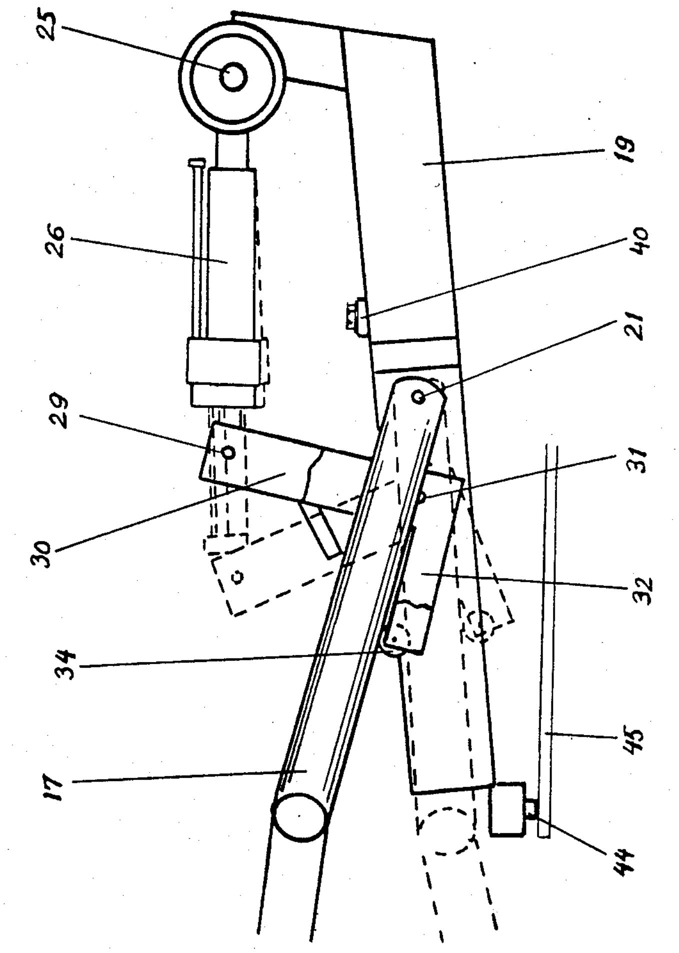

As schematically illustrated in FIG. *3b* portion 17 of the lifting arm 3 is at its innermost end pivotally mounted at 21 and extends outwardly between the transfer link plates. As is also clear from FIG. 3*b* portion 17 rests on pressure roll 34 which is coupled to the transfer link adjacent the outer end of forwardly bent portion 32. Since the transfer link plates are pivotally mounted to the foot plates 19 and 20 respectively at their inner side walls it will be realised that when transfer link 30, 32 as discussed below, is pivoted around axis 31 from the position illustrated with dashed lines in FIG. 3*b* to the position illustrated with full lines therein, the entire lifting arm 3 will simultaneously be pivoted around axis 21 due to the contact between pressure roll 34 and portion 17 of the lifting arm.

In the position illustrated in FIG. 1 and in the lifting arm 3 is in its lowermost position. When the electrical motor 25 is activated, which is carried out by means of an operating lever which is brought to a position "upwards", and the electrical motor 25 starts, the driving means 26 pulls in the output shaft 27, the link arrangement 30, 32 is swung around the axis 31 and, as indicated above, through its contact with the inner or rear portion 17 of the lifting arm, the pressure roll 34 lifts the entire lifting arm 3 upwards around its fixed pivot 21. When the lifting arm 3 is to be lowered the operating lever is moved to the position "downwardly", the electrical motor 25 starts and rotates in the reverse direction, the output shaft 27 is extended by means of the driving means 26, the link 30, 32 is swung forwardly/downwardly around the axis 31, and the lifting arm 3 can be swung downwardly around its fixed pivot 21. In this connection it should be noted that even if the lifting arm 3 will move downwards due to its own gravity and possibly additional load, there is also a forced operation of the lifting arm 3 in a downward direction due to the fact that a shoulder 35 (FIG. 3) is attached to the link 30 in such a way that when the inner or rear portion 17 of the lifting arm is swung downwardly by means of the link 30 this shoulder 35 will contact the upper side of the arm 17 and press it downwardly. This is important in another aspect since, as will be explained more closely below, a catch mechanism for locking the wheel-chair in position on the car floor is activated by means of the lifting arm, when this in its position where it is completely swung in, is forced to swing downwardly and thereby to act upon a catch and maintain this in a locking position.

The lifting arm 3 can be swung sideways by means of swinging equipment. As is best illustrated in FIG. 2 an electrical motor 36 for the swinging movement is pivotally attached to the frame at a mounting position 37. The motor 36 has a conventional gear change and a drive means 38 which forces an output shaft 39 to move outwardly or inwardly respectively depending upon the direction of rotation of the electrical motor. The foot 18–22 of the lifting equipment is pivotally mounted around a vertical pivot axle 40 (compare with FIG. 3). The output shaft 39 is connected to a pivotally mounted link 41 at 42, and when the output shaft 39 by the drive means 38 is moved outwardly it brings the link 41 to swing in counter-clockwise direction (as seen in FIG. 2) about vertical pivot axle 40, and by means of a connecting arm 43 that is attached to the frame of the lifting equipment the lifting arm 3 and its supporting foot and drive means are swung in a counter-clockwise direction as seen in FIG. 2. During this swinging movement the weight of the equipment is transmitted to the support plate 8 through a roll 44 mounted in a bracket 44A at the outer end of the supporting foot. Roll 44 runs in a roller way 45 provided on top of the upper support plate 8 and transmits the vertical forces to said roller way. Thus, whenever supporting foot 18 is swung about the vertical pivot axis 40, the roll 44 runs in the roller way 45 so that the vertical forces applied to the lifting arm 3 are continuously transmitted to the upper support plate 8.

The electrical motor 36 for bringing about the swinging movement of the lifting arrangement is actuated by means of an operating lever which in a position "inwardly" actuates the electrical motor to rotate in the direction that brings about the inward swinging of the entire lifting apparatus towards the center of the car, and an actuation of the operating lever to its position "outwardly" brings about an extension of the output shaft 27 and a swinging of the lifting arm 3 in a counter-clockwise direction as seen in FIG. 2, in such a way that the lifting arm is swung outwardly towards and past the door opening 2 as illustrated in FIG. 1.

The electrical equipment for the different electrical functions is contained in a box 46.

FIG. 1 illustrates a catch mechanism 47 for locking the wheel-chair in the correct position on the floor when it is to be used as driver's seat in the car. The catch or lock mechanism 47 consists of an elongate, hook-shaped plate which is pivotal around a longitudinal axis between an opened or unlocked position and a closed locking or catching position. This pivotal movement is brought about by means of a motion transmitting link structure, schematically depicted in FIG. 1, positioned under the Z-shaped stand plate 4 and extends up to an actuating lever 48. The actuating lever 48 is spring-biased in an upward direction, that is to the position in which the catch 47 is unlocked or released. When the wheel-chair has been placed in the intended position and is to be locked there by means of the catch 47, the lifting arm 3 is swung to its position where it is placed as far as possible in towards the middle of the car, which position is determined by means of a limit switch, where the power supply to the electrical motor by force is cut-off. Subsequently the lifting equipment is lowered by means of the raising and lowering mechanism, whereby the rear portion 17 of the lifting arm 3 contacts the catch actuating mechanism 48 and depresses the same and whereby the motion transmitting link mechanism (not shown in the drawings) converts this depressing movement to a pivotal movement for the catch mechanism 47 which then locks the wheel-chair to the vehicle floor.

In this position when the wheel-chair is used as driver's seat the lifting arm 3 is folded to a retracted storage position in which the arm is locked by means of a latch mechanism 49.

Figure 6A:
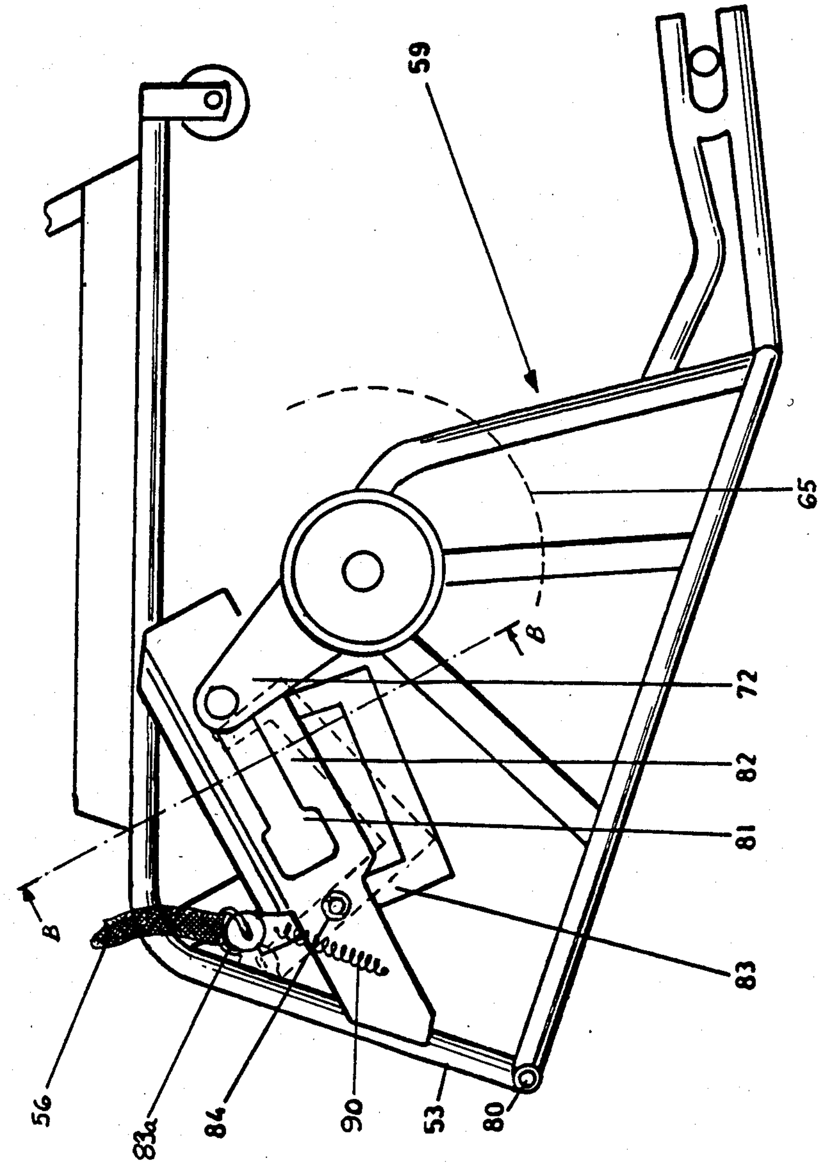
Figure 6B:
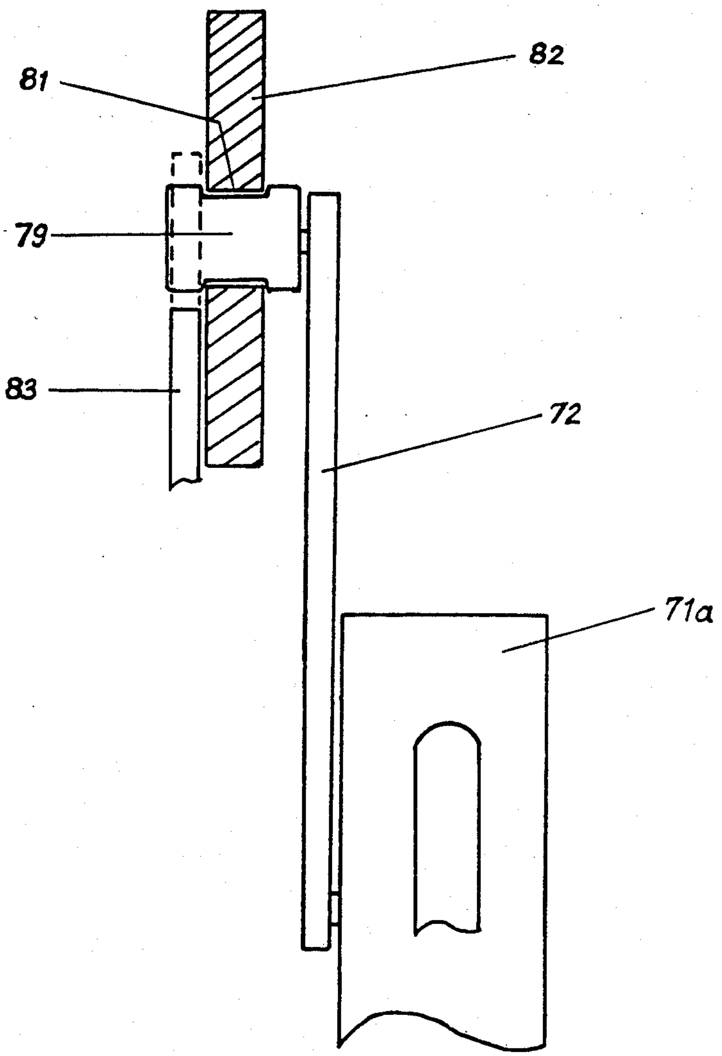
Figure 6C:
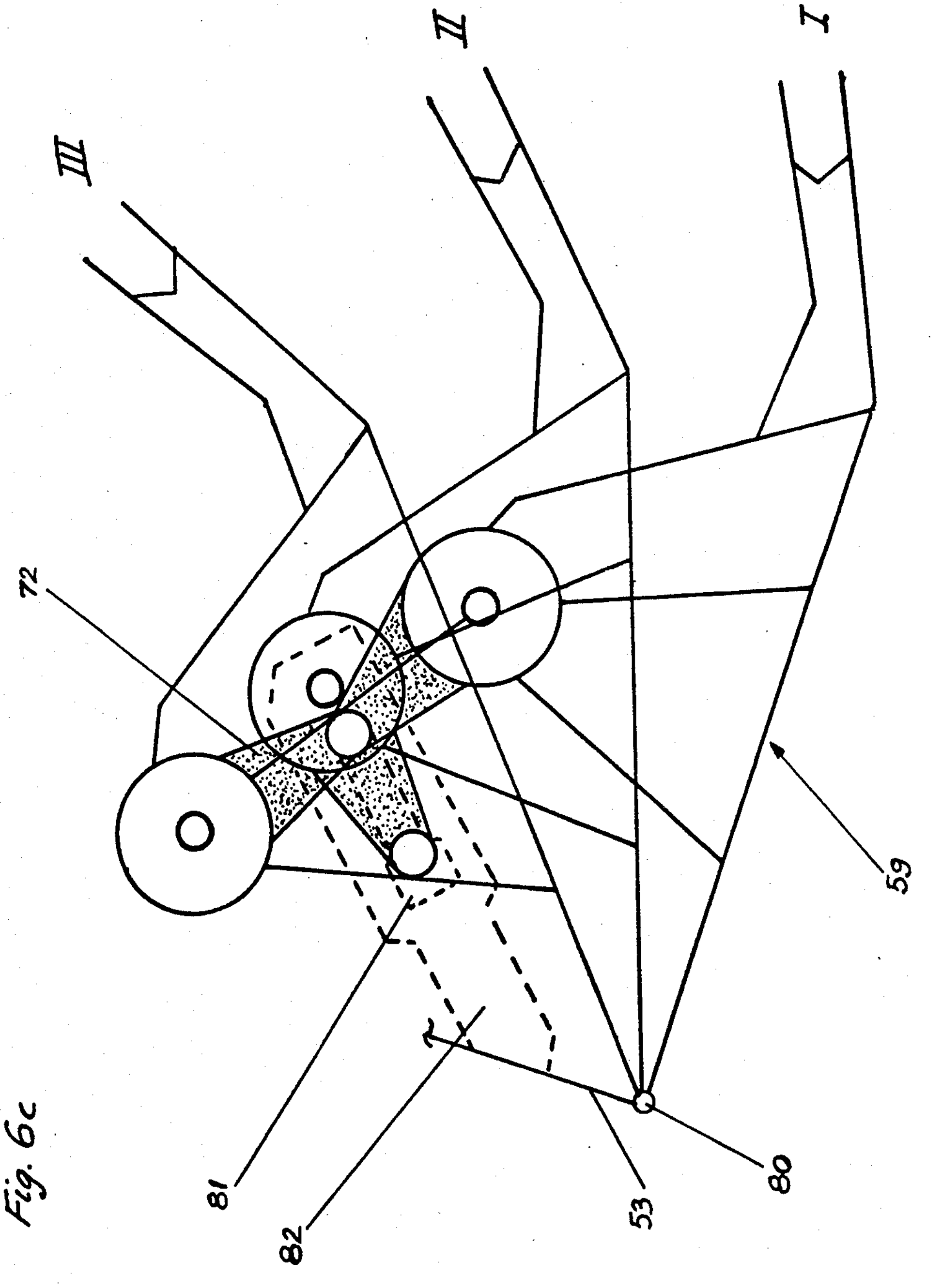

With reference to FIGS. 4 to 6 a wheel-chair according to the invention will now be described, which wheel-chair is specifically adapted for use together with the above described lifting apparatus.

With reference to FIG. 4 the wheel-chair basically consists of a cushion seat 50 with a backrest 51 the inclination of which can be adjusted by means of an adjusting means 52 which does not constitute any part of the invention and which accordingly will not be described in detail. The seat 50 is fixed to a frame 53 which is provided with a bracket (not shown in FIG. 4) which is engaged by the latch or locking mechanism 47 of the lifting apparatus when the wheel-chair is locked to the vehicle floor. Due to the fact that the catching point for locking the wheel-chair is positioned in the seat frame and not, as has been common before, in the chassis frame said chassis frame does not have to be dimensioned to stand the loads that are stipulated in traffic safety regulations (corresponding to 12 g for the driver's seat in an automobile). The seat framme 53 is moreover provided with guide rolls 54 which run on the mounting plate 5 (FIG. 1) anchored to the vehicle when the wheel-chair is installed in the vehicle. Finally, the seat is also provided with a pair of arm rests 55 in connection with each one of which one end of a pair of crosslaid lifting straps 56 are releasably attached. The other ends of the lifting straps 56 are (as will be described more closely below) attached to a pair of latches 83 in the chassis frame for actuating the same. The lifting straps 56 are at the point where they cross each other connected by means of a lifting hook 57 which will be connected to the lifting apparatus by the maneuvering of the wheel-chair into and out from the vehicle.

The chassis frame 58 basically consists of two portions, namely a cradle 59 which is pivotally connected to the frame 53 at 80 (FIG. 6*a*) and in which the rear drive wheels 60 and a propulsion and folding maneuvering means 61 are mounted, and a suspension 62 which is pivotally connected to the frame 53 as well as to the cradle 59 and in which the small front wheels 63 and a conventional foot plate 64 are mounted. The suspension 62 is also connected to a gas cylinder (not shown in the Figures) which controls the suspension 62 and through this indirectly the cradle 59 for folding the wheel-chair prior to its lifting into the vehicle.

With reference to FIGS. 5 and 6*a–c* the propulsion and folding maneuvering means 61 will now be described more in detail. Actually one propulsion and folding maneuvering means is provided by each side of the wheel-chair but since these are identical only one of them will be described. Thus, the arrangement comprises a hand wheel 65 which is provided with a sprocket 66. When the disabled uses the wheel-chair to move around he actuates the hand wheel 65 whereby this through a chain drive 67 drives the rear wheel 60 which likewise is provided with a sprocket 68. Through this arrangement it is easy to change the transmission ratio of the propulsion by varying the size of sprockets, and this is of a great practical importance since the propulsion hereby can be adapted for instance to the weight or the strengths in the arms of the user.

The hand wheel 65 is by means of a pin 69 journalled in an inner ball-bearing 70 the outer race of which in turn is fixed in an outer ball-bearing 71 the outer race 71*a* of which is fixed to the cradle 59 (indicated by means of dashed lines in FIG. 5). The inner race of the outer ball-bearing 71 is fixed to a crank arm 72 and the function thereof will be described more closely below with reference to FIGS. 6*a–c*.

In order to cover the chain drive 67 a chain guard 73 is provided which is fastened partly at the rear wheel and partly at the outer end of the pin 69. In connection with the mounting of the chain guard 73 at the pin 69 the chain guard is provided with through holes 74 which are arranged opposite each other and in which pegs 75 are slidably mounted. Furthermore, a bushing 76 is displaceably arranged on the pin 69 between the chain guard 73 and the hand wheel 65. Finally, an operating lever 77 is pivotally mounted at the outer end of the pin 69 by means of a bolt which is screwed into an internally threaded, axial bore in the pin 69. The operating lever 77 is pivotal between a propulsion position and a braking and folding position respectively and is thereby designed in such a way that in the area of its mounting on the fastening bolt it discloses a curve shape in such a way that it in its propulsion position does not actuate the pegs 75 which in the assembled condition protrude a short distance from the chain guard 73. However, when the operating lever 77 is swung to its braking and folding position its curved portion will engage the pegs 75 and press these inwardly to contact the bushing 76 which in turn is pressed against the hand wheel 65. The hand wheel 65 which in turn is slidably and rotatably mounted on the pin 69 is thereby pressed inwardly into contact with the inner ring of the outer ball-bearing 71 through a friction lining 78 provided therebetween. As will be described more closely below with reference to FIG. 6 the crank arm 72 is, in the condition for propulsion of the wheel-chair, blocked against rotation around the ball-bearing 71 and in this condition the operating lever 77 is thus working as a brake due to the fact that the hand wheel 65 through the friction lining 78 is pressed against the bearing of the blocked crank arm 72.

As has been indicated above the propulsion and folding means 61 has a double-function since it is also used for folding the wheel-chair when the wheel-chair is to be lifted into a vehicle by means of the above described lifting apparatus in order to function as a driver's seat therein. This function shall now be described more closely with reference to FIG. 6*a* in which the cradle 59 is illustrated in greater detail, but the hand wheel and the chain guard have been deleted for reasons of clarity. The cradle 59 consists of a steel tube frame which is articulately connected to the seat frame 53 at 80 and which also communicated with the frame 53 due to the fact that the crank arm 72 by means of a roll 79 (see FIG. 5 and especially FIG. 6*b*), which is provided with a groove, is guided in a cut-out portion 81 in a guide plate 82 which is attached to the seat frame 53 partly directly adjacent the seat 50 and partly at a point near the joint 80. In the normal condition the free end of the crank arm 72 is locked in the upper end of the cut-out portion 81 by means of the above-mentioned latch 83 which by means of spring 90 is biased to this locking position illustrated with dashed lines on FIGS. 6*a* and 6*b*.

When the wheel-chair has been moved up to the vehicle, in order to be lifted into the vehicle, the catching loop 11 of the lifting apparatus is hitched to the lifting hook 57 which keeps the crosslaid lifting straps 56 in their place as has been described above. When the lifting arm 3 of the lifting apparatus subsequently is maneuvered upwardly in such a way that the weight of the wheel-chair and the user loads the lifting straps 56, the latch 83 is swung away against the biasing of spring 90 in order to release the crank arm 72 due to the fact that, as has been mentioned above, the front endsof the lifting straps 56 are mounted in the latch 83 (FIG. 6*a*) which in turn is mounted for pivotal movement around the joint 84. In this connection it should also be pointed out that although only one guide plate 82 and latch 83 are visible on the drawings, it is preferable to use one such combination by each side of the wheel-chair, that is one for each propulsion and folding means. Thus, when the wheel-chair is lifted up from the ground by means of the lifting arm and the latch 83 has been released the operating lever 77 is brought to the position which by normal propulsion of the wheel-chair brings about the braking of the wheel-chair. As mentioned above this causes the hand wheel to be pressed against the bearing 71 of the crank arm 72 by means of the pegs 75 and the bushing 76 and through the friction lining 78. The blocking of the crank arm 72 is now released due to the fact that the latch 83 has been swung away to permit roll 79 to move in cut-out portion 81 of the plate 82. Maneuvering of the hand wheel 65 will however, through the friction engagement between the hand wheel, the friction lining 78 and the bearing 71 of the crank arm 72, rotate the crank arm 72 in the same direction. Since the free end of the crank arm 72 is guided in the cut-out portion 81 it will, by a continued maneuvering of the hand-wheel 65, initially move downwards in the cut-out portion at the same time as the entire cradle is swung upwardly around the joint 80, and will then, when it has rotated over approximately 90°, once more move upwardly in the cut-out portion 81 until it has been swung to the position illustrated with dashed lines when the cradle is completely swung up towards the seat, in which position the free end of the crank arm once more is positioned at the upper end of the cut-out portion. Through the action of the above-mentioned, not shown, gas cylinder the wheel-chair is maintained in this folded condition during the lifting thereof into the vehicle, and when the wheel-chair is once more lowered down and placed in its position in the vehicle, and the lifting straps 56 are thus once more relieved, the latch 83 will through its spring-biasing means 90 be returned to the position where it blocks the crank arm 72 and thus locks the wheel-chair in the folded condition.

With specific reference to FIGS. **6*a*–*c* the releasing and blocking of the crank arm by means of the latch 83 and the pivoting of the cradle will now be explained in detail. As mentioned above the latch 83 is normally biased to its position illustrated with dashed lines in FIGS. 6*a* and 6*b* by means of biasng spring 90. As is especially clear from FIG. 6*b* latch 83 is positioned adjacent the inner side of the guide plate 82 and is pivoted in a plane parallel to the guide plate 82. Thus, it will be understood that the latch 83 in its normal position (illustrated with dashed lines in FIGS. 6*a* and 6*b*) bears against roll 79 at the outer end of the crank arm 72 and blocks movement of the latter in the cut-out portion 81 in the guide plate 82. As discussed above and as illustrated in FIG. 6*a* the lifting strap 56 is attached to the latch 83 at 83*a*, and this means that when the wheel chair is lifted by means of the lifting arm coupled to the hook 57, the load is transmitted through strap 56 to latch 83 so that latch 83 is swung clockwise in FIG. 6*a* against the action of biasing spring 90. This released position is illustrated in full lines in FIGS. 6*a* and 6*b*. Thus, it will now be understood that in this position for the latch 83 the roll 79 at the outer end of the crank arm 72 is free to move in the cut-out portion 81 of the guide plate 82**.

As discussed above a maneuvering of operating lever 77 to its braking and folding position causes the hand wheel to be operatively connected to the crank arm 72 through the friction lining 78, and this means than when the operating lever 77 is brought to said folding position and the wheel chair has been lifted off the ground by means of the lifting arm, a counter-clockwise rotation of the hand wheel (as seen in FIGS. 5 and **6*a*) will be transmitted to crank arm 72 through said friction lining. However, since roll 79 is restricted to move in the cut-out portion 81 such a counter-clockwise rotation of the crank arm 72 is still blocked due to the fact that the cut-out portion has an extension other than that which would permit rotation of the crank arm in the outer race 71*a* of the outer ball bearing 71, as discussed above. This means that a further operation of the hand wheel 65 will cause a reaction force to be applied to said outer race 71*a* which is connected to the cradle 59. As a result of this reaction force the operation of the hand wheel will cause the cradle to pivot about the joint 80 from position I in FIG. 6*c* and towards position II therein. Since the distance between joint 80 and the centre of outer race 71*a* is fixed during this pivotal movement roll 79 will move to the left in FIG. 6*c* in the cut-out portion during the simultaneous pivotal movement of cradle 59 and counter-clockwise rotation of the crank arm 72 to position II in FIG. 6*c*. Likewise the roll 79 will return to the upper end of cut-out portion 81 when this pivotal and rotational movement continues toward position III in FIG. 6*c*, so that when the folding maneuver is completed roll 79 is once more positioned at the uppermost end of the cut-out portion 81 and may once more be blocked in that position when the latch 83 is unloaded and is returned to its blocking position by means of biasing spring 90**. When unfolding the wheel-chair the hand wheel is rotated clockwise and the operation is exactly the same as disclosed above but only reversed.

The lifting out of the wheel-chair from the vehicle is accomplished in the corresponding way.

By means of the described structure it is on the one hand achieved that the wheel-chair is very simple and uncomplicated to use due to the combined propulsion and folding maneuvering mens and on the other hand that the wheel-chair due to the special folding mechanism is very safe even if it should be maneuvered in an incorrect manner. The last mentioned fact is achieved by means of the latches 83, which are operatively connected to the lifting straps 56, due to the fact that these latches very effectively prevent any folding of the wheel-chair before it is hitched to the lifting apparatus and raised a distance by means thereof. Thus, there is no danger of the wheel-chair being unintentionally folded when it is being used as a common wheel-chair. Moreover there is no danger of the disabled himself inadvertently releasing the wheel-chair from the lifting apparatus before the latch in the correct manner has been caused to block the movement of the crank arm. Should the user by mistake not have unfolded the wheel-chair completely in connection with its lifting-out from the vehicle he will notice this immediately when the wheel-chair is lowered down onto the ground, and thus while it is still hanging in the lifting arm, since it in that situation only very slowly would collapse during the downward movement of the lifting arm. If this situation should occur it is thus only necessary to manuever the lifting arm upwards again and to unfold the wheel-chair in the correct manner whereby the latches are activated at the same instance as the wheel-chair is put down onto the ground and the lifting straps 56 are relieved.

Through the described design and swinging-up of the cradle a further advantage is achieved, namely that in the unfolded condition for the wheel-chair, when this is used for conventional transportation, the backrest is relatively upright, while the backrest in the folded condition of the wheel-chair is inclined backwards in a suitable position for driving a car. The inclination can moreover be adjusted by means of the mentioned adjustment means 52.

As has been mentioned above the chassis frame of the wheel-chair also comprises a suspehsion 62 for the front wheels 63 but this suspension does not constitute any essential part of the invention but is substantially based upon conventional technique and will thus not be described in detail neither in the Figurs nor in the description. It should only be mentioned that due to the fact that this suspension 62 is pivoted on the one hand in the seat frame 53 and on the other hand in the cradle 59 it is effectively locked in a folded and unfolded condition respectively. When the wheel-chair is to be folded and the cradle in the above described manner has been released and swung upwardly by means of the hand wheel the suspension 62 is also released and it is thereby folded or retracted in step with the swinging-up of the cradle operated by the not shown gas cylinder. Furthermore, the front wheels 63 and the suspension are provided with co-operating guide surfaces whereby the front wheels, when the suspension is folded, simultaneously are swung inwardly towards the middle of the wheel-chair in such a way that they when the wheel-chair is completely collapsed have assumed a horizontal position immediately below the seat 50. Finally, the foot plate 64 is also provided with an adjusting means 85 for adjusting its height and by means of this adjusting means it is at the same time guaranteed that the foot plate 64, independently of its adjusted height in the unfolded condition for the wheel-chair, always will be positioned at the same level of height in relation to the seat when the wheel-chair is collapsed.

Even if the invention has been described and illustrated herein with reference to a suitable embodiment thereof it should be obvious for a man skilled in the art that this embodiment is not intended to be restricting, but only explanatory and thus modifications and alterations can be carried out within the scope of the invention as this is indicated in the enclosed patent claims.

I claim:

1. Apparatus for lifting a wheel-chair into an out from a vehicle comprising a lifting arm which may be connected to the wheel-chair, a substantially Z-shaped stand having a lower support and mounting plate for attachment to the vehicle floor at the place for the driver's seat, substantially vertical middle portion and an upper support plate for positioning on top of a back seat of the vehicle, and means coupled to the upper support plate and to the lifting arm for pivoting the lifting arm in a vertical and horizontal direction to lift the wheel-chair into and out of the vehicle.

2. Apparatus according to claim 1, wherein the lifting arm is bent at an angle and is rotatably mounted to a middle shaft, the rotational movement of the outer part of the lifting arm being blocked by means of a movement restriction stop, the middle shaft being pivotally mounted in an outer part of a portion which is bent at an angle and which extends in towards a pair of bifurcately combined foot plate and the lifting arm being journalled for swinging movement around an axis which extends between the foot plates.

3. Apparatus according to claim 1, wherein the pivoting means includes a first means for pivoting the lifting arm in a vertical direction by an electrical motor which through a transmission is connected to a drive means and an output shaft having a position sensing rod constructed with a limit switch the shaft being connected to a motion transfer link which is pivotally mounted in a pair of foot plates, a forwardly bent portion of the transfer link being provided with a pressure roll which engages a portion of the lifting arm to raise and lower arm when output shaft causes the transfer link to pivot relative to the foot plates.

4. Apparatus according to claim 3 wherein the pivoting means further includes a second means for pivoting the lifting arm in a horizontal direction by an electrical motor which through a transmission and a drive means operates a second output shaft for swinging the first means and the lifting arm around a vertical pivot axle through a connecting arm coupled to a link which is connected to the second output shaft and which is pivotally mounted.

5. Apparatus according to claim 4 wherein a roll journalled to a foot plate runs in a roller way provided on upper support plate, to transmit the weight of the first means to the support plate through roll during pivoting of the lifting arm in a horizontal direction.

6. Apparatus according to claim 5, wherein a latch mechanism blocks a wheel-chair that is positioned as a driver's seat in the vehicle, whereby the latch mechanism comprises a elongate, hook-like plate which is pivotal between a lowered and a raised position, in that this pivotal movement, through a motion transmitting link structure, is caused by engagement of the lifting arm with an actuating lever and its depression thereof by the swinging of the lifting arm into its position furthermost in towards the middle of the vehicle.

7. In combination, a lifting apparatus for lifting a wheel-chair into and out from a vehicle, comprising a lifting arm which may be connected to the wheel chair, a substantially Z-shaped stand having a lower support and mounting plate for attachment to the vehicle floot at the lace for the driver's seat, a substantially vertical middle portion and an upper support plate for positioning on top of the back seat of the vehicle, and means coupled to the upper support plate and to the lifting arm for pivoting the lifting arm in a vertical and horizontal direction to lift the wheel chair into and out of the vehicle and, a wheel-chair for conventional use as a transport means indoors and outdoors and for use as a driver's seat in a vehicle and adapted for use together with said lifting apparatus, said wheel-chair comprising a seat mounted on a collapsible chassis frame, a backrest attached to the seat, a number of lifting straps for being coupled together with the lifting apparatus and having at least one hand wheel for the propulsion of the wheel-chair when used in a conventional manner, and a combined propulsion and folding maneuvering means mounted in a cradle which is pivotally connected to the wheel-chair seat and in which the rear wheels of the wheel-chair are mounted for swinging up to a position behind the wheel-chair backrest of the seat.

* * * * *